Dec. 22, 1953   C. LIPKIN   2,663,093
MULTIPLYING CALCULATOR, INCLUDING A SLIDABLE SLATE
Filed April 20, 1951   2 Sheets-Sheet 1
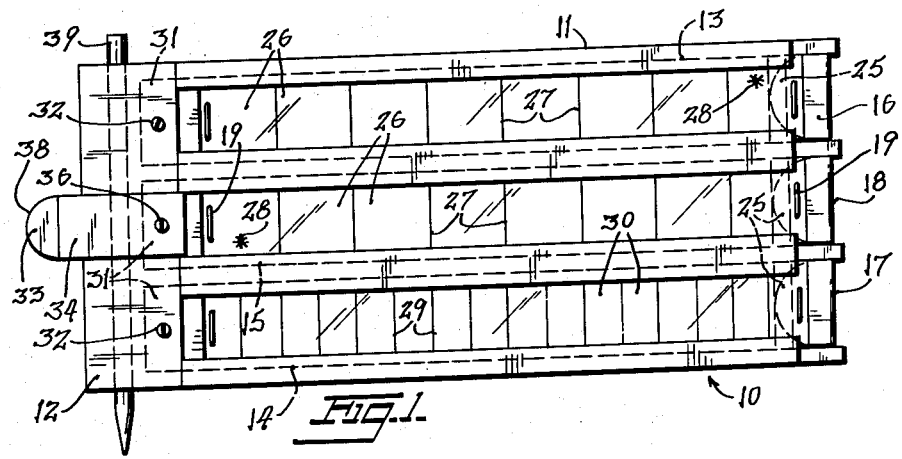
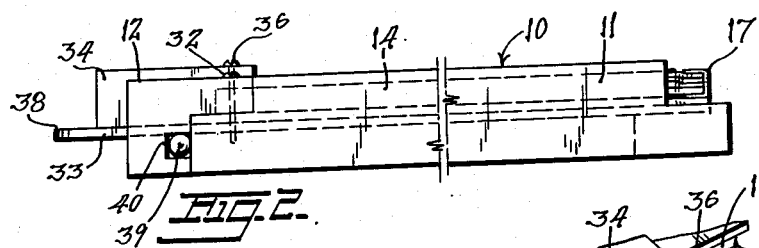
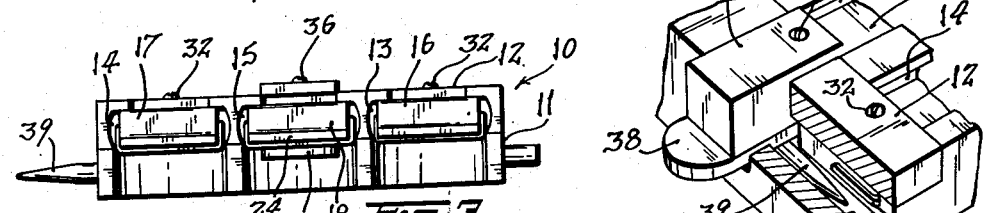
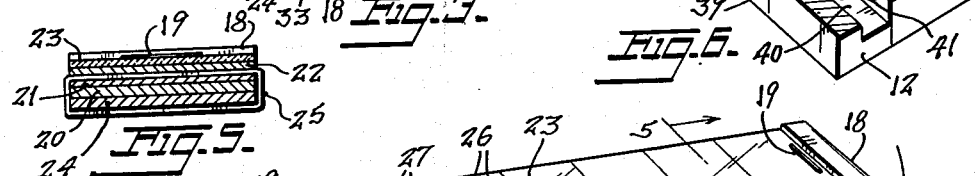
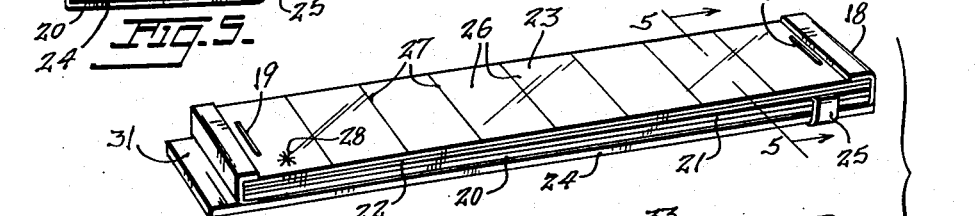
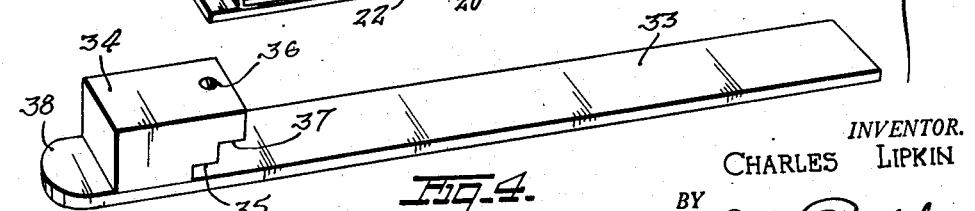
INVENTOR.
CHARLES LIPKIN
BY
ATTORNEY Dec. 22, 1953  C. LIPKIN  2,663,093
MULTIPLYING CALCULATOR, INCLUDING A SLIDABLE SLATE
Filed April 20, 1951  2 Sheets-Sheet 2
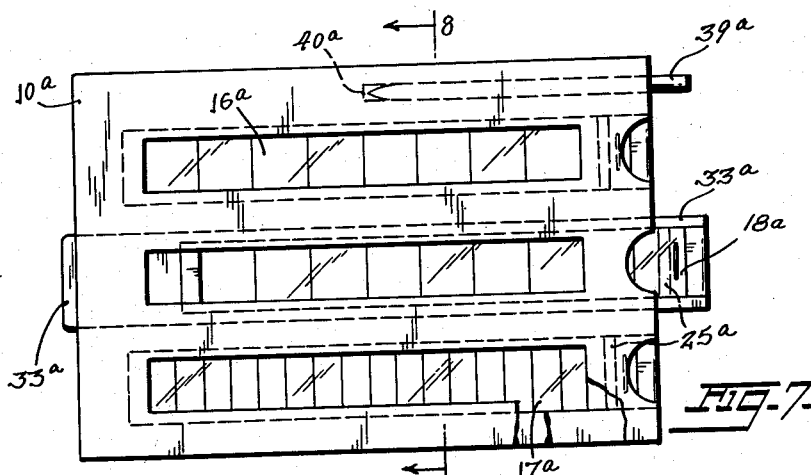
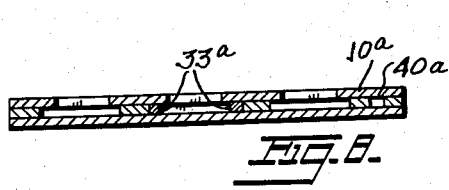
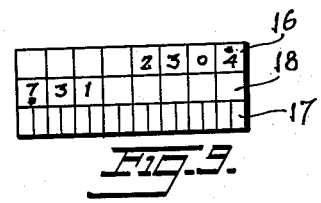
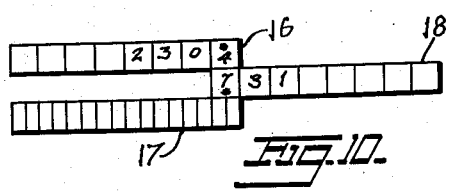
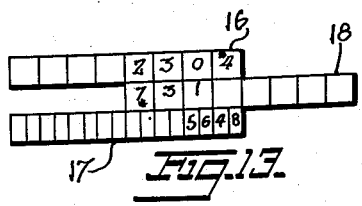
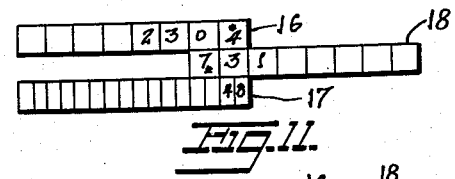
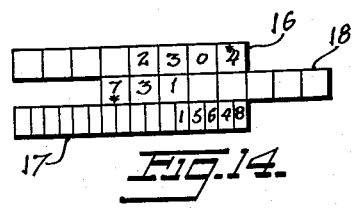
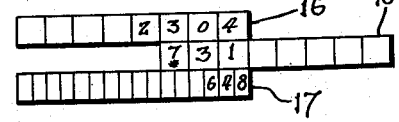
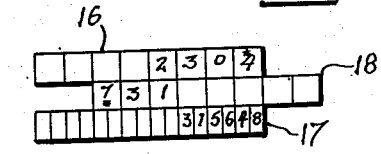
INVENTOR.
CHARLES LIPKIN
BY
ATTORNEY Patented Dec. 22, 1953

2,663,093

UNITED STATES PATENT OFFICE 2,663,093

MULTIPLYING CALCULATOR, INCLUDING A SLIDABLE SLATE

Charles Lipkin, New York, N. Y.

Application April 20, 1951, Serial No. 222,059

8 Claims. (Cl. 35—31)

This invention relates to new and useful improvements in indicating devices for assisting in multiplication of two numbers.

More particularly, the present invention relates to an aid for carrying out multiplication, of simple and novel construction and operation using the principle of slide multiplication whereby any number or figure may be quickly multiplied by any other number or figure and the product quickly and accurately obtained.

One object of the present invention is to provide a device which superficially resembles a slide rule but in reality is an indicating device adapted to be used in conjunction with the sliding method of multiplying numbers.

Another object of the present invention is to take advantage of the obvious utility found in the common "magic slate" and to combine forms thereof with an indicating device adapted to be used in conjunction with the sliding method of multiplying numbers.

A further object of the present invention is to provide with an indicating device adapted to be used in conjunction with the sliding method of multiplying numbers and including "magic slates" upon which numbers are erasably indicated, novel means effective for facilitatedly erasing said numbers from the "magic slates."

Another object of the present invention is to provide in an indicating device adapted to be used in conjunction with the sliding method of multiplying numbers, a stationary "magic slate" divided into a plurality of boxes for having the numbers of a multiplicand indicated therein, a sliding "magic slate" also divided into a plurality of boxes for having the numbers of a multiplier indicated therein, and a stationary "magic slate" divided into a plurality of boxes sufficient in number for indicating the product of the multiplier and multiplicand.

Another object of the present invention is to provide in an indicating device adapted for aiding in the multiplication of numbers and including a pair of "magic slates" for indicating multiplier and multiplicand and one of which is slidingly movable relative to the other, means effective for indicating when the said "magic slates" are properly positioned for commencing a multiplying operation.

Another object of the present invention is to provide in an indicating device employing "magic slates," novel "magic slate" arrangements which are facilitatedly attachable to the device and removable for being discarded and replaced.

Still another object of the present invention is to provide in a device including a slidable member and a stylus or similar marking implement, novel means whereby said stylus may be employed for locking the slidable member as to prevent sliding thereof and means for assuring the retention of said stylus in its effective slide-locking position when such is desired.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plane view illustrating the device of the invention.

Fig. 2 is a front side elevational view of the device.

Fig. 3 is a left-hand side elevational view.

Fig. 4 is an isometric view illustrating the B-slate and the slide to which it is ordinarily fastened.

Fig. 5 is a sectional view taken along the lines 5—5 in Fig. 4.

Fig. 6 is a fragmentary broken away and enlarged isometric view illustrating the stylus retaining means.

Fig. 7 is a top plan and partially broken away view of a second embodiment of the invention.

Fig. 8 is a sectional view taken along the lines 8—8 in Fig. 7, but with the "magic slates" removed.

Figs. 9 through 15 are schematic illustrations showing the progressive movements of the B-slate during a multiplication operation.

Now with reference to the drawings in more detail, and particularly to Figs. 1, 2 and 3, it will be seen that the invention provides a frame 10, comprising a base member 11 and a side block 12. Formed in the base member 11 are first, second, and third undercut channels 13, 14 and 15, respectively; and provided for being slidingly inserted therein are first, second, and third "magic slates" 16, 17 and 18, respectively.

Shown in Figs. 4 and 5 is the construction of the third "magic slate" 18, the description of which will be sufficient for the understanding of all three. Secured together by staples 19, or the like, and arranged superimposedly is an elongated first backing member 20, a wax surfaced strip 21, a translucent strip 22, and a transparent strip 23. Arranged beneath the first backing member 20 is a second backing member 24. A strap member 25 having its extremities secured to the second backing member 24 adjacent the right end thereof passes transversely and loosely between the wax surfaced and translucent strips 21 and 22, respectively. It will be seen that this arrangement permits the "magic slate" 18 to be slidingly moved rightwardly with respect to the second backing member 24.

Now the present form of "magic slate" is similar to the common form in that markings or indications may be caused to appear thereon by writing with a stylus or similar marking implement, which causes the translucent strip 22 to adhere to the wax surfaced strip 21 which is usually darkly colored.

In the present arrangement erasures, or the stripping of the translucent strip from the wax surfaced strip, are effected by the strap member 25 when the "magic slate" 18 is slidingly moved rightwardly with respect to the second backing member 24 to which said strap member is anchored.

Now, with reference to Figs. 1 and 4, it will be seen that both the first and third "magic slates" 16 and 18, respectively, are equally divided into pluralities of indicating spaces or boxes 26. Said spaces or boxes 26 are formed by permanent vertical markings 27 which may be provided either on the translucent or transparent strips 22 and 23, respectively. Also permanently marked in the right-handmost space 26 in the first "magic slate" 16 is an asterisk or like marker 28. Similarly marked is the left-handmost one of the spaces 26 in the third "magic slate" 18.

The second "magic slate" 17 is provided with vertical markings 29 which divide it into a plurality of indicating spaces or boxes 30 sufficient in number for indicating the digits of the product of the square of any factor indicated in the boxes of either the first or third "magic slate." There are twice as many boxes 30 as boxes 26.

As best shown in Figs. 1 and 4, all of the "magic slates" are provided at the extremities opposite the strap members 25 with a tab 31 formed off the second backing members 24. The tabs 31 of the first and second "magic slates" are adapted to be secured in the frame 10 by screws or the like 32 in the side block 12 and passing therethrough. This arrangement permits the "magic slates" 16 and 17 to be erased simply by slidingly pulling same outwardly from the channels 13 and 14, respectively, while their related second backing members 24, and therefore the strap members 25, are held relatively still.

Provided for being slidingly inserted in the third channel 15 beneath the second backing member of the third "magic slate" 18 is a slip stick 33 which is best seen in Fig. 4. Affixed adjacent the left-hand end of the slip stick is a block 34. A first step 35 undercut in said block 34 is adapted to receive the tab 31 of the third "magic slate" and a screw 36 is provided for securing same. A second step 37 undercut in the said block 34 is provided for receiving and holding down the left-hand extremity of the third "magic slate" 18. This arrangement permits the said third "magic slate" to move slidingly in the channel 15 with the slip stick 33. A tab 38 formed off the left-hand end of said slip stick 33 facilitates the holding of said slip stick while the "magic slate" is moved rightwardly and outwardly from the channel 15 to thereby effect erasures of markings thereon.

As shown best in Figs. 1, 2 and 6, the present device is provided with a stylus 39 for effecting markings on the several "magic slates." A passage 40 through the frame 10 one wall of which is formed in part by the slip stick block 34 is provided for both retaining said stylus when not in use and for effecting locking of the said slip stick. A leaf spring 41, having one end thereof imbedded in the base member 11 and disposed in the passage 40, is effective for cooperating with and assuring the retention of the said stylus in said passage.

A second embodiment of the invention is seen in Figs. 7 and 8 and contemplates the provision of a frame 10a made up of three superimposed layers of material and having a slip stick 33a arranged slidingly between the first and third layers. Arranged slidingly in the frame 10a, also, are first and second "magic slates" 16a and 17a, respectively, and similarly arranged in the mentioned slip stick 33a is a third "magic slate" 18a.

Strap members 25a are provided for the same purpose as described above. However, in the present arrangement the ends of the strap member cooperating with the first and second "magic slates" 16a and 17a extend into and are secured in the walls forming the associated channels in the frame 10a, while the ends of that one cooperating with the third "magic slate" are secured in the said slip stick. For this purpose the sides of slip stick 33a are raised to form a channel for slate 18a and the ends of strap 25a for this slate are embedded in said sides. With this arrangement it is possible to eliminate the second backing member 24 required in the construction of the first embodiment described above.

A stylus 39a is provided for use with this embodiment, also, and when not in use is stored in a passage 40a in the mentioned frame 10a.

Now, the present invention in both of its shown embodiments may be considered a new form of indicating device which permits the answers to multiplication problems being "read" in significant figures, rather than in logarithmic scales which must be deciphered and which may have varying values.

In order to explain the manner in which the device indicates and assists in the multiplication of a pair of numbers, a complete problem will be now worked out as though it was being indicated on the "magic slates" of the first embodiment.

The problem is to multiply 2304 by 137, and as seen in Fig. 9, either one of these factors may be selected as the multiplicand and marked in the first "magic slate" 16 with the units digit in the space marked with the asterisk. Thereafter, the multiplier is marked in the third "magic slate" 18 in reverse and with the units digit thereof also located in the asterisk marked space.

Then, as shown in Fig. 10, the third slate is moved slidingly to align vertically the asterisk marked spaces of the first and third slates. The aligned numbers are then multiplied to obtain the product of "7 times 4" which is "28." The "8" is marked in the first space of the second "magic slate" 17 and the "2" is carried.

The third slate is then moved to the left to align the "7" with the "0" and the "3" with the "4" in the manner seen in Fig. 11. Again the vertically aligned numerals are multiplied and the sum of the products thereof plus the previously carried "2" amounts to "14." The "4" is marked in the next space of the second slate and the "1" is carried.

Again, the third slate is moved, and in the position thereof seen in Fig. 12, the "7" is aligned vertically with the "3," the "3" with the "0" and the "1" with the "4," and again these aligned numerals are multiplied. The sum of these products plus the previously carried "1" amount to "26." The "6" is marked on the second slate and the "2" is carried.

The just described procedure is repeated following progressive sliding movements of the third slate 18, which movements and the manner of marking the final product are clearly illustrated in the remaining Figs. 13, 14 and 15.

It will be understood that it is immaterial as to which of the factors is shown on either slate or which one thereof is marked reversedly. Also, for persons who find it difficult to remember the numbers to be carried, the boxes or spaces in which no computations are taking place may be utilized for marking down the carried numbers.

It is to be noted that the present device possesses the advantage of having the final product marked down, which is not found in slide rules or the like.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an indicating device of the class described for aiding in the multiplication of numbers; the combination of a frame member provided with three parallel channels, a stationary first "magic slate" disposed in a first of said channels and divided as to provide a plurality of spaces for the indication of digits comprising a multiplicand; a stationary second "magic slate" disposed in a second of said channels and divided as to provide a plurality of spaces sufficient for the indication of a product; a third "magic slate" disposed in a third of said channels between the first and second thereof and being similar to the first and for the indication of digits comprising a multiplier; and said third slate being slidingly movable relative to the others as to render any digit of the multiplier vertically alignable with any digit of the multiplicand.

2. In an indicating device of the class described for aiding in the multiplication of numbers; the combination of a frame member provided with three parallel channels, a stationary first "magic slate" disposed in a first of said channels and divided as to provide a plurality of spaces for the indication of digits comprising a multiplicand; a stationary second "magic slate" disposed in a second of said channels and divided as to provide a plurality of spaces sufficient for the indication of a product; a third "magic slate" disposed in a third of said channels between the first and second thereof and being similar to the first and for the indication of digits comprising a multiplier; and said third slate being slidingly movable relative to the others as to render any digit of the multiplier vertically alignable with any digit of the multiplicand, and said first and third "magic slates" each having markings to indicate the multiplier integer spaces and for being aligned vertically to assure the proper multiplication commencing positions of the said first and third "magic slates."

3. In an indicating device of the class described for aiding in the multiplication of numbers; the combination of a frame member provided with three parallel channels, a stationary first "magic slate" disposed in a first of said channels and marked as to provide a plurality of juxtaposed spaces for the indication of digits comprising a multiplicand; a stationary second "magic slate" disposed in a second of said channels and marked as to provide a plurality of juxtaposed spaces sufficient for the indication of the digits of at least the square of said multiplicand; a third "magic slate" disposed in a third of said channels between the first and second thereof and being similar to the first and for the indication of digits comprising a multiplier; and said third slate being slidingly movable relative to the others as to render any digit of the multiplier vertically alignable with any number of the multiplicand.

4. In an indicating device of the class described for aiding in the multiplication of numbers; the combination of a frame member provided with three parallel channels, a stationary first "magic slate" disposed in a first of said channels and marked as to provide a plurality of juxtaposed spaces for the indication of digits comprising a multiplicand; a stationary second "magic slate" disposed in a second of said channels and marked as to provide a plurality of juxtaposed spaces sufficient for the indication of the digits of at least the square of said multiplicand; a third "magic slate" disposed in a third of said channels between the first and second thereof and being similar to the first and for the indication of digits comprising a multiplier; and said third slate being slidingly movable relative to the others as to render any digit of the multiplier vertically alignable with any number of the multiplicand, and the right and left-hand end ones of the spaces of the said first and third "magic slate," respectively, having permanent markings to indicate the multiplier integer spaces and for being aligned vertically to assure the proper multiplication commencing positions of the said first and third "magic slates".

5. In a device, as set forth in claim 1, wherein each "magic slate" comprises the superimposed arrangement of an elongated backing member, a wax surfaced strip, a translucent strip, and a transparent strip, all of which strips are secured at their extremities to said backing member; of spaced permanent markings on said translucent strip whereby the "magic slate" is divided into a plurality of juxtaposed data indicating spaces.

6. In a device, as set forth in claim 2, wherein each "magic slate" comprises the superimposed arrangement of an elongated backing member, a wax surfaced strip, a translucent strip, and a transparent strip, all of which strips are secured at their extremities to said backing member; of spaced permanent markings on said translucent strip whereby the "magic slate" is divided into a plurality of juxtaposed data indicating spaces, another elongated backing member; and a strap member secured at both ends to the second mentioned backing member and passing transversely between said wax surfaced and translucent strips, whereby markings caused by the adherence of said translucent strip to said waxed surface may be erased by slidingly moving the first mentioned backing member longitudinally relative to the said strap and the second mentioned backing member.

7. In an indicating device as set forth in claim 3, further including a slip stick slidingly insertable in said third channel; the "magic slate" slidingly inserted in said third channel including a superimposed elongated arrangement of a backing member, a wax surfaced strip, a translucent strip, and a transparent strip, all of which are secured together at their extremities; another backing member slidingly inserted in said third channel beneath the "magic slate" and secured to said slip stick; and a strap member secured at its ends to the second mentioned backing member and passing transversely between said wax surfaced and translucent strips, whereby markings caused by adherence of said translucent strip to said waxed surface may be erased by slidingly moving the first mentioned backing member outwardly from said channel while holding firmly therein the said slip stick.

8. In an indicating device as set forth in claim 4, further including a slip stick slidingly insertable in said third channel; the "magic slate" slidingly inserted in said third channel including a superimposed elongated arrangement of a backing member, a wax surfaced strip, a translucent strip, and a transparent strip, all of which are secured together at their extremities; another backing member slidingly inserted in said third channel beneath the "magic slate" and secured to said slip stick; and a strap member secured at its ends to the second mentioned backing member and passing transversely between said wax surfaced and translucent strips, whereby markings caused by adherence of said translucent strip to said waxed surface may be erased slidingly moving the first mentioned backing member outwardly from said channel while holding firmly therein the said slip stick; a mark effecting implement for use with the "magic slates"; and axially alignable passages through said frame and slip stick for maintaining said slip stick locked when the said implement is retained therein.

CHARLES LIPKIN.

References Cited in the file of this patent

| Number | Name | Date |
|---|---|---|
| 1,609,972 | Sherrer et al. | Dec. 7, 1926 |
| 1,729,916 | Vernon | Oct. 1, 1929 |
| 2,198,347 | Mitnitzky | Apr. 23, 1940 |
| 2,359,195 | Berliner et al. | Sept. 26, 1944 |
| 2,367,608 | Ponnock | Jan. 16, 1945 |
| 2,422,421 | Kaufman | June 17, 1947 |